Nov. 17, 1970   D. G. HOFF   3,540,271
LOAD MEASURING METHOD AND APPARATUS
Filed Nov. 8, 1968
3 Sheets-Sheet 1
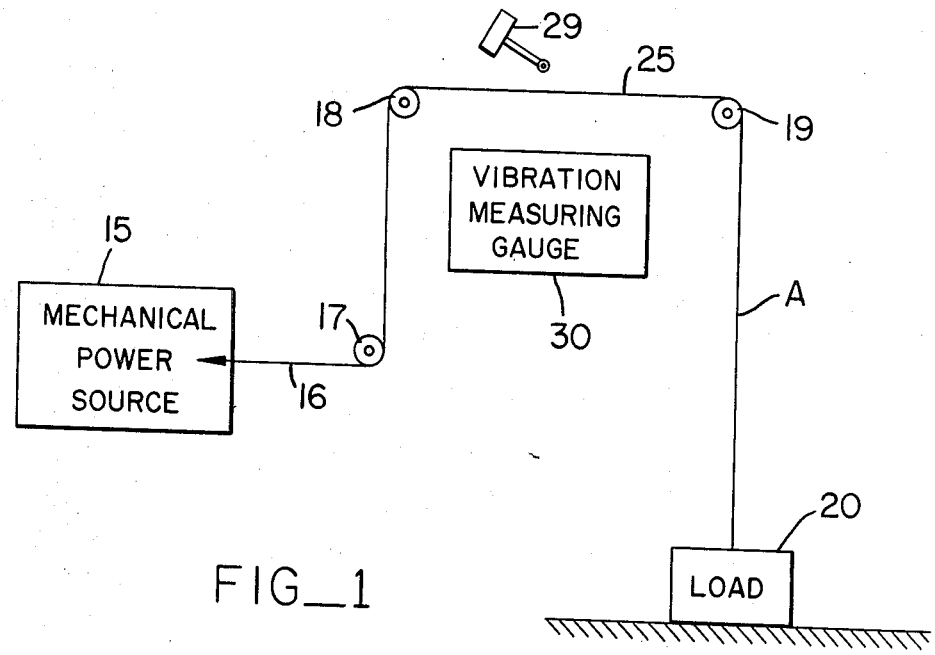
FIG_1
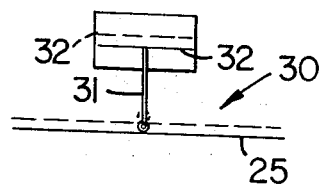
FIG_2
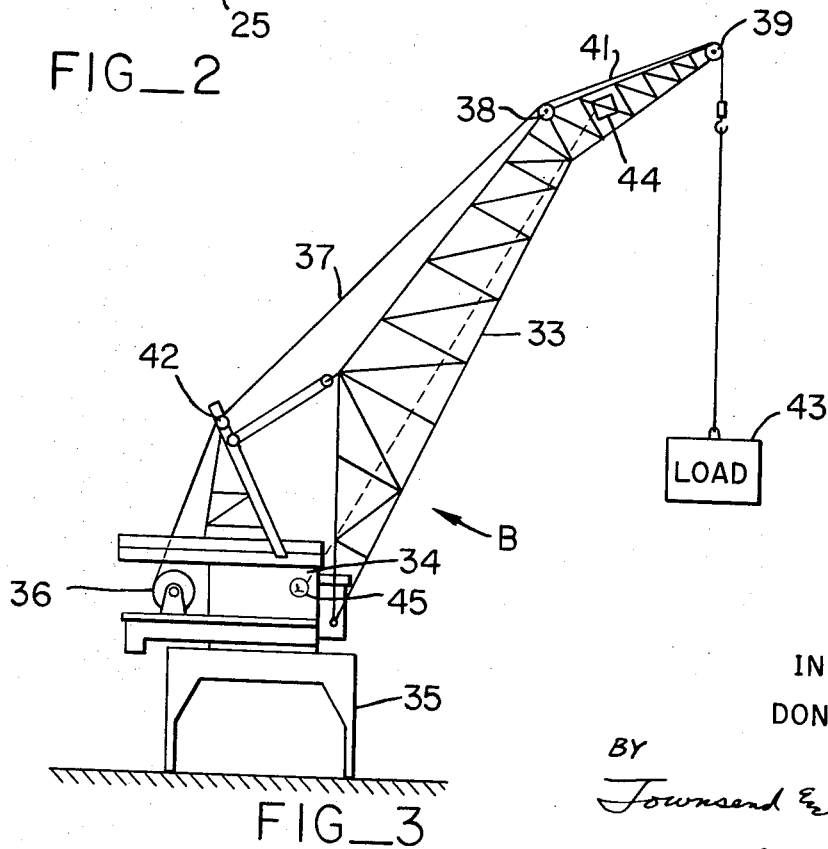
FIG_3
INVENTOR
DON G. HOFF
BY
Townsend & Townsend
ATTORNEYS

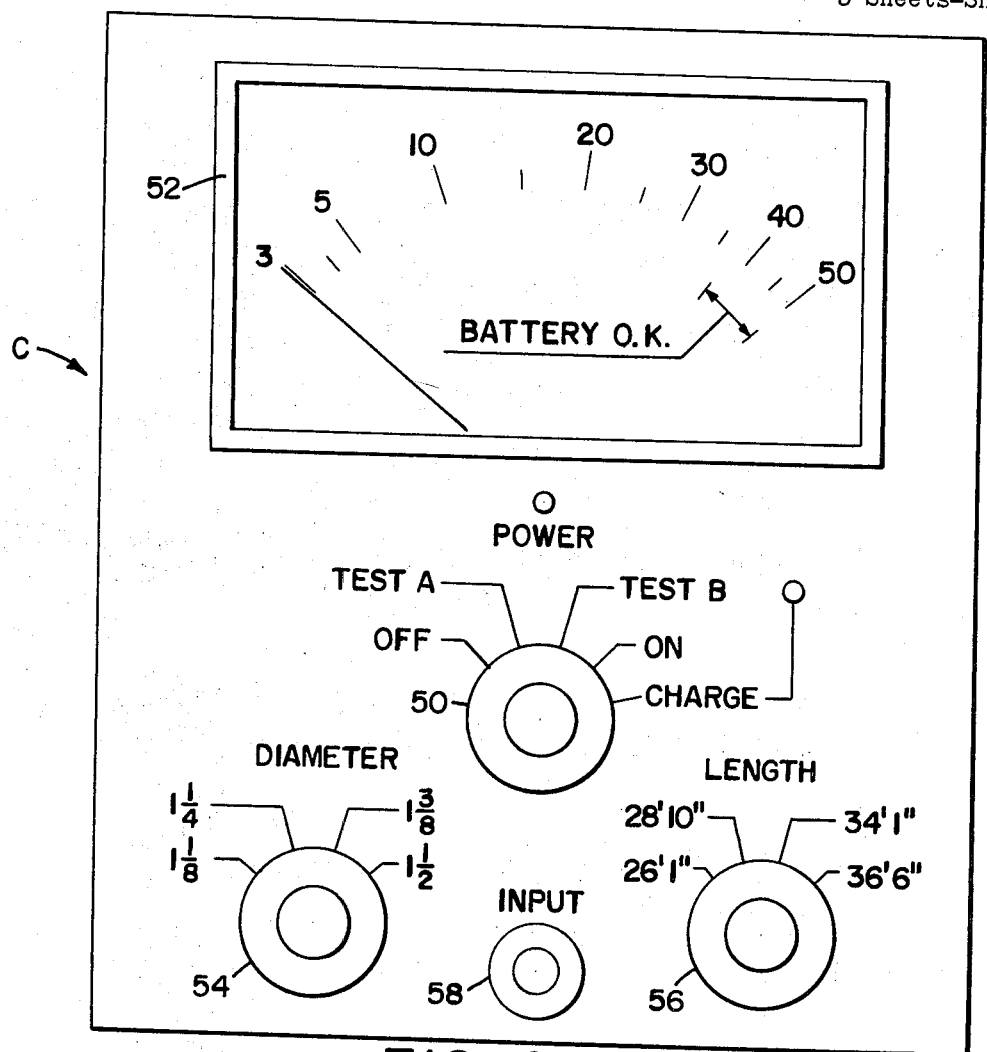

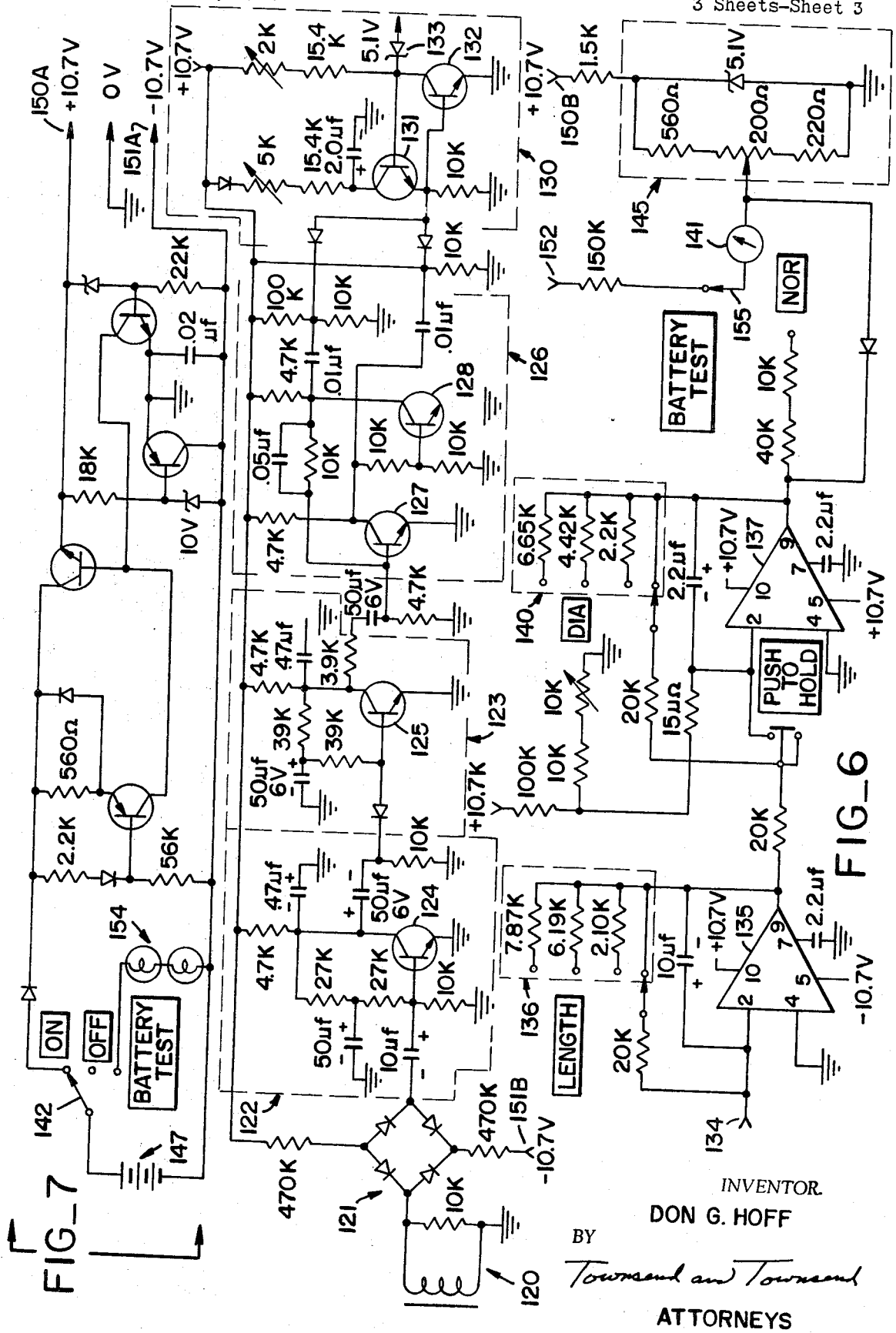

United States Patent Office 3,540,271
Patented Nov. 17, 1970

3,540,271
LOAD MEASURING METHOD AND APPARATUS
Don G. Hoff, 634 Bamboo Terrace,
San Rafael, Calif. 94903
Continuation-in-part of application Ser. No. 541,770,
Apr. 11, 1966. This application Nov. 8, 1968,
Ser. No. 777,989
Int. Cl. G01l 5/10
U.S. Cl. 73—143      7 Claims

ABSTRACT OF THE DISCLOSURE

A method for determining the stress on a freely suspended cable segment by measuring the frequency of natural vibration of the segment, converting the measurement to stress for a cable segment of pre-determined length and diameter, and adjusting the converted measurement to actual length and diameter, and apparatus for accomplishing the method.

---

This is a continuation-in-part of copending U.S. patent application Ser. No. 541,770, filed Apr. 11, 1966, now abandoned.

This invention relates to a method for determining the stress being applied to a moving cable and more particularly to a method and apparatus for measuring the tension on a loaded cable.

In industrial lifting devices such as elevators, winches, bridges, cranes and the like, wire rope cables are normally employed in conjunction with a prime mover to lift, support or move heavy weights. It is desirable, and in many instances essential, to constantly be aware of the tension being applied to the cable both while it is in a static condition and during the interval when the device is moving or supporting the load, to prevent the application of excessive tension to the cable, or to equalize the tension between several parallel cables. Excessive tension may cause the cable to either break or become weakened and fracture when a lesser load is subsequently applied thereto or in the case of several cables may cause an overloading of one of the several cables. In other instances, information as to the tension on the cable may be employed to operate a servo or controller mechanism and thereby control the use of the lifting apparatus.

One known method of measuring the stress on static or moving cables incorporates the technique of vibrating a portion of cable positioned between two fixed points. By measuring the resonant frequency of the cable and knowing the cable length and mass, the stress upon the cable can be determined. Apparatus has been suggested that would accomplish this stress measurement through application of the formula:

$$S = (2Lf)^2 D$$

Where $f$ is the frequency in cycles per second, $L$ is the length of the vibrating cable, $D$ is the linear density and $S$ is the stress; see U.S. Pat. No. 2,618,970, issued Nov. 25, 1962. However, such devices are of extremely limited capability as the resulting measurement is only correct for one pre-determined cable diameter and length.

Broadly stated, the present invention is directed to a device for determining the stress on a freely vibrating cable by measuring the natural frequency of the cable and translating the measurement into meaningful tension increments irrespective of the diameter and length of the vibrating cable segment. In a preferred aspect, the cable tension can be read continuously in terms of stress so as to immediately identify increases in cable loading.

The objects of this invention, as well as the features and advantages thereof will become apparent from the following description of the invention especially when reference is made to the accompanying drawings, wherein:

FIG. 1 is a schematic illustration of this invention;
FIG. 2 is a schematic illustrating a vibration measuring device as employed in the present invention;
FIG. 3 is a schematic of a crane employing the present invention;
FIG. 4 is a diagrammatic representation of the panel for an electronic stress measuring device;
FIG. 5 is a system block diagram of the electronic stress measuring device; and
FIGS. 6 and 7 are schematic diagrams of circuits for the electronic measuring device.

Referring to the drawings, there is provided in FIG. 1 a schematic view showing the principle of the invention in which a cable train generally indicated at A is arranged at one end with a mechanical power source 15 arranged to pull a cable 16 through the train consisting of sheaves 17, 18 and 19 for movement of a load 20. The mechanical power source may take the form of a drum supplied with appropriate power for winding the cable in order to cause movement of a load 20. Sheaves 18 and 19 are mounted within train A a fixed distance apart and are arranged so that cable 16 changes direction by virtue of the two sheaves 18 and 19 to form a straight resonant stretch 25 of cable between the two sheaves 18 and 19. It can be seen that during all phases of operation the cable can be pulled throughout its operative length and resonant stretch 25 will maintain a consistent functional length.

During the moving operation, resonant stretch 25 is caused to vibrate as by striking the cable with a hitting hammer 29 or, alternatively, the movement of the cable during transportation of load 20 can result in a natural vibration of stretch 25.

A vibration measuring gauge 30 is mounted in proximity to stretch 25 in such a way as to sense the vibration of stretch 25 without being unduly influenced by any vibrations which may be in the remainder of the cable portion. This is accomplished by placing the vibration measuring gauge or transducer 30 in functional contact with stretch 25 only. The vibration transducer may take many conventional forms, for example, as shown in FIG. 2 one end of a needle 31 may be in direct contact with stretch 25 and the opposite end can be applied to a transducing element 32, such as in the simplest sense, the diaphragm of a microphone.

The dynamic load which is being exerted upon wire rope or cable 16, irrespective of the fact that the cable is moving in cable train A, can be quickly determined through a measurement of the frequency of vibration occurring in resonant stretch 25 of the wire rope located between two fixedly spaced sheaves 18 and 19. This can be accomplished even though obviously the actual portion of the wire rope positioned between the sheaves is continuously changing. It is necessary only that the length of wire rope located between the sheaves 18 and 19 remain constant.

The loading of the cable 16 against sheaves 18 and 19 substantially dampens the resonant vibrations developed in the cable length beyond the sheaves. Under the aforesaid conditions, when that resonant stretch 25 vibrates, either naturally or by inducement, a measurement of the resulting resonant frequency will be a direct correlation with the stress (tension) upon the cable. Therefore, this value for the frequency can then be employed, i.e., knowing the distance between sheaves 18 and 19 and the cable mass, to determine the stress upon the cable.

As previously stated, the natural frequency of vibration of wire rope or cable 16 which is rigidly supported at its ends, is dependent upon the length, tension and linear density (mass per unit length) of the rope.

By passing the cable 16 in tangential contact with the two fixedly positioned sheaves 18 and 19 while maintaining a constant distance, i.e., stretch 25, by which they are separated, a constant length resonant element is maintained. Therefore, with cable 16 being of known diameter, a close approximation of the maximum frequency tolerable in the wire rope can be easily and quickly determined with the formula set forth supra. Thus, by knowing the maximum stress to which the cable can be subjected, the maximum frequency which can be tolerated can be obtained from the above formula.

In FIG. 3 a crane B is shown having a boom 33 attached to cab 34 and supporting structure 35. Cab 34 contains conventional mechanical power means 36 depicted as a drum, to be operated with an appropriate power source. A wire rope 37 is arranged so as to be lengthened or shortened by the power means 36. Cable 37 is pulled over sheaves 38 and 39 positioned so as to be fixedly spaced a distance apart to provide a resonant stretch 41. Cable 37 cooperates at one end via sheave 42 with the mechanical power source 36 in cab 34 to support and move load 43.

Vibration sensing means 44 is positioned in close proximity near wire rope 37 between sheaves 38 and 39 for measuring the frequency of vibration of resonant stretch 41. Gauge means 45, activated by the signal from sensing means 44, is positioned so as to be visible to an operator in cab 34. Here, again, mechanical means can be employed to cause the wire rope between sheaves 38 and 39 to vibrate, or the natural vibration can be measured.

Through observation of gauge means 45 the operator can easily ascertain the frequency of vibration of length 41 of moving cable 37, and be constantly apprised of the load thereon. Furthermore, the indicating means may be combined with a warning device or switching means, so that should the frequency of vibration become excessive, a signal from vibration sensing means 45 would actuate a warning device or present further power from being applied through the prime mover, thereby preventing damage to the cable.

While the invention has been described with particular reference to its application to the measurement of the tension on moving wire ropes employed in cranes, it is clear that it is also applicable to other devices which employ moving wire ropes, such as elevators, derricks and the like. In elevators employing multiple cables, each cable can be vibrated separately and the tension thereby determined with respect to each other. The load which each cable supports can then be adjusted accordingly.

Referring now to FIG. 4, panel C includes 5-way power switch 50, meter 52 having a read-out calibrated in proportion to the square root of the stress in order to correspond to the out-put of the circuit depicted by the block diagram of FIG. 5, and adjustable switches 54 and 56 for correcting the resistance to respond to the actual diameter and length of the cable segment being tested. Panel C is further provided with an in-put opening 58 into which is inserted a conventional electro-magnetic sensing device for receiving a signal corresponding to the frequency of vibration of the cable being tested. For purposes of illustration, adjustable member 54 is adapted to provide corrected readiness for cables having a diameter of 1⅛ inch, 1¼ inch, 1⅜ inch, and 1½ inch. Similarly, adjusting member 56 is adapted to provide corrected readings for various lengths of cable segments, such as 26′ 1″, 28′ 10″, 34′ 1″ and 36′ 6″. It will be apparent to one skilled in this art that any number of other diameters and lengths can be pre-set into the system.

The system design and circuitry for the electronic tension measuring apparatus is shown in FIGS. 5–7. According to the block diagram of FIG. 5, a transducer 100 is provided to pick up the vibrations of a cable held under tension between two fixed points. The transducer generates an electrical signal having a frequency equal to the frequency of vibration of the cable. A peak limiter or clipper 101 limits the amplitude excursions of the generated electrical signal which is then fed through an amplifier 102 to a wave shaper 103 for generating a generally square wave signal. The shaped square wave signal is then fed through a pulse quantizer 104 which generates a series of uniformly polarized spike pulses having a frequency corresponding to the frequency of vibration of the cable. The pulse quantizer 104 may, for example, generate a pulse for each zero crossover in a negative going direction of the square wave received from shaper 103. The pulse quantizer thereby, in effect, differentiates and rectifies the square wave. Alternatively, a separate differentiating circuit and rectifying circuit can be used instead of the single pulse quantizer circuit.

The polarized pulse signal is then integrated by an operational amplifier 105 to provide a D.C. voltage component proportional to the frequency of vibration of the cable. A feedback loop around the operational amplifier passes through a resistance 107 previously set at the control panel of the device to be proportional to the length of cable between the fixed points of measurement. Operational amplifier 105, functioning as an integrator amplifier integrates the linear, constant signals proportional to the frequency of vibration of the cable and the length of cable between fixed points of measurement. The integral of functions which are linear and constant is of course the product of the constant parameters. Thus, the operational amplifier functions as a multiplier. The out-put from the operational amplifier 105 is therefore a D.C. signal proportional to the frequency of vibration of the cable and the length of vibrating cable between fixed points of measurement. This signal is then processed by a second operational amplifier 106 having a feedback loop through a resistance proportional to the square root of the linear density or mass of the cable. The latter parameter is in turn proportional to the square root of the diameter and the resistance is pre-set at the control panel to a value proportional to the square root of the diameter of the cable.

The final out-put which is then fed to meter 110 is a D.C. signal having a level proportional to the frequency of vibration of the cable, the length of vibrating cable between the fixed points of measurement, and the square root of the diameter of the cable. Referring to the equation previously presented, these parameters are related to the stress on the cable as follows:

$$S = (2Lf)^2 D \text{ or } \sqrt{S} = 2Lf\sqrt{D}$$

It is thus apparent that the out-put from operational amplifier 106 is proportional to the square root of the stress on the cable. This signal actuates meter 110 which is calibrated to provide a direct reading of the stress on the cable. Thus, the indicia on the meter are scaled proportional to the square root of the stress so that a direct visual reading in terms of the stress on the cable is provided. Meter 110 corresponds to meter 52 of FIG. 4.

By way of example, the schematic diagram of a circuit implementing the block diagram of FIG. 5 is shown in FIG. 6. According to this embodiment of the invention the transducer is in the form of a magnetic pickup 120 which generates an electrical signal having a frequency corresponding to the frequency of vibration of a cable, the stress on which is to be measured. This signal passes through a diode bridge 121 which serves as a peak limiter or clipper. The signal is then amplified by two stages of amplification 122 and 123 including transistors 124 and 125 connected in grounded emitter circuits. The transistors may be, for example, 2N708 type transistors. The clipped amplified signal is then shaped into a generally square wave configuration by means of a trigger circuit 126 formed by transistors 127 and 128 which may be, for example, 2N708 type transistors. The generally square wave signal then activates a pulse quantizer circuit 130 including transistors 131 and 132 which may be, for example, 2N3702 and 2N2369 type transistors, respectively, connected to generate a spike pulse at each zero crossing in a negative going direction of the shaped square wave. The out-put from this pulse quantizer circuit is a polarized pulse signal having a frequency proportional to the vibration of the cable. The pulse quantizer circuit 130 effectively differentiates and rectifies the square wave signal. Zener diode 133 which may be, for example, a 1N751A type diode provides temperature compensation for the pulse quantizer circuit. From Zener diode 133 the signal enters the input 134 of operational amplifier 135.

The pulse signal is integrated by an operational amplifier 135, which may be an integrated circuit amplifier, to provide a D.C. signal proportional to the frequency of vibration of the cable. The operational amplifier in effect averages the pulse signal. A feedback loop is provided around the operational amplifier 135 through one of a plurality of resistors 136 selected to be proportional to the length of cable vibrating between fixed points of measurement. Thus, the out-put of operational amplifier 135 is a D.C. signal having a level proportional to the frequency of vibration of the cable and the length of cable.

This signal is fed through a second operational amplifier 137 which includes a feedback loop through one of a plurality of resistors 140 selected to be proportional to the square root of the diameter of the cable. The resistance selected is thereby also proportional to the linear density or mass of the cable. The out-put of operational amplifier 137, proportional to the frequency of vibration of the cable, the length of cable between the fixed points of measurement, and the square root of the diameter of the cable is then directed to the meter 141 calibrated to provide a direct reading of the stress on the cable. A network 145 is also provided for offset adjustment of the tension indicating scale on the meter.

The power supply for the circuit illustrated in FIG. 6 is a portable battery pack for which it is advantageous to include at least one test battery circuit. Such a power supply circuit and battery test circuit are illustrated in FIG. 7 with connections to the circuit of FIG. 6 as indicated. Thus, the positive side 150A of the power supply is connected at terminal 150B, and the negative side 151A of the power supply connected at terminal 151B. For an alternate battery test circuit shown in FIG. 7, the positive side of the battery 147 is connected at terminal 152. Since an accurate power supply is necessary to provide a correct stress reading at the meter 144, the power of the batteries may be quickly checked. Means can also be provided for charging the batteries through a conventional A.C. outlet when the battery level is below that necessary for proper operation of the circuit.

Two battery test circuits are available in the circuits shown in FIGS. 6 and 7. Alteration between the battery test circuit shown in FIG. 7 and the tension measuring circuit of FIG. 6 is provided by means of a switch 142 shown in FIG. 7 which may be positioned between the battery test circuit, the tension measuring circuit and off. Indication for adequacy of the battery power levels is provided by lamps 154. Alternatively, the same meter 141 which provides the stress readings can be used to indicate battery power level. As illustrated in FIG. 6, switch 155 can be positioned for testing the battery through meter 141 or for indicating the stress on the cable.

In the control panel shown in FIG. 4 another battery test arrangement is contemplated whereby two battery test circuits provide readings directly from the meter.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for measuring the stress on a cable suspended and vibrating between two fixed points of measurement comprising: generating an electrical signal having a frequency equal to the frequency of vibration of the cable; shaping the electrical signal into a generally square wave form; quantizing and polarizing the generally square wave electrical signal to produce a polarized pulse signal having a pulse frequency corresponding to the frequency of vibration of the cable; integrating the pulse signal to thereby produce a first D.C. signal having a level proportional to the frequency of vibration of the cable; multiplying said first D.C. signal with a D.C. component proportional to the length of the cable between said fixed points of measurement to thereby produce a second D.C. signal proportional to the frequency of vibration of the cable and the length of the cable between said fixed points of measurement; and multiplying said second D.C. signal with a D.C. component proportional to the square root of the diameter of said cable to thereby produce a third D.C. signal proportional to the frequency of vibration, the length, and the square root of the diameter of the cable between said fixed points of measurement.

2. A method for measuring the stress on a cable suspended and vibrating between two fixed points of measurement comprising:

generating an electrical signal having a frequency equal to the frequency of vibration of the cable; shaping the electrical signal into a generally square wave form; differentiating and restifying the generally square wave electrical signal to produce a pulse signal having a pulse frequency corresponding to the frequency of vibration of the cable; integrating the pulse signal to produce a first D.C. signal having a level proportional to the frequency of vibration of the cable; multiplying said first D.C. signal with a D.C. component proportional to the length of the cable between said fixed points of measurement to thereby produce a second D.C. signal proportional to the frequency of vibration of the cable and the length of the cable between said fixed points of measurement; and multiplying said second D.C. signal with a D.C. component proportional to the square root of the diameter of said cable to thereby produce a third D.C. signal proportional to the frequency of vibration, the length, and the square root of the diameter of the cable between said fixed points of measurement.

3. A method for measuring the stress on a cable suspended and vibrating between two fixed points of measurement comprising:

generating a first D.C. signal having a level proportional to the frequency of vibration of the cable; multiplying said first D.C. signal with a D.C. component proportional to the length of the cable between said fixed points of measurement to thereby produce a second D.C. signal proportional to the frequency of vibration of the cable and the length of the cable between said fixed points of measurement; and multiplying said second D.C. signal with a D.C. component proportional to the square root of the diameter of said cable to thereby produce a third D.C. signal proportional to the frequency of vibration, the length, and the square root of the diameter of the cable between said fixed points of measurement.

4. Apparatus for measuring the stress on a cable suspended and vibrating between two fixed points of measurement comprising:

a transducer for generating an electrical signal having a frequency equal to the frequency of vibration of the cable;

circuit means for generating from said electrical signal a first D.C. signal having a level porportional to the frequency of vibration of the cable;

means for multiplying said first D.C. signal with a D.C. component proportional to the length of the cable between said fixed points of measurement to thereby produce a second D.C. signal proportional to the frequency of vibration of the cable and the length of the cable between said fixed points of measment; and means for multiplying said second D.C. signal with a D.C. component proportional to the square root of the diameter of said cable to thereby produce a third D.C. signal proportional to the frequency of vibration, the length, and the square root of the diameter of the cable between said fixed points of measurement.

5. Apparatus for measuring the stress on a cable as set forth in claim 4 wherein said means multiplying said first D.C. signal with a D.C. component proportional to the length of vibrating cable comprises an operational amplifier having a feedback loop through a resistance proportional to the length of vibrating cable and wherein means is provided for varying said resistance according to the length of said cable whose stress is to be measured.

6. Apparatus for measuring the stress on a cable as set forth in claim 4 wherein said means multiplying said second D.C. signal with a D.C. component proportional to the square root of the diameter of said cable comprises an operational amplifier having a feedback loop through a resistance proportional to the square root of the diameter of said cable and wherein means is provided for varying said resistance according to the diameter of the cable whose stress is to be measured.

7. A device for determining the stress on a length of cable comprising:

means generating a first signal proportional to the natural vibration frequency of the length of the cable;

means modifying said first signal so as to produce a second signal proportional to the vibration frequency and the length of cable;

means modifying said second signal so as to produce a third signal proportional to the vibration frequency, the length, and the square root of the diameter of the length of cable.

References Cited

UNITED STATES PATENTS

| 2,040,874 | 5/1936 | Pack | 73—143 |
| 2,265,786 | 12/1941 | White | 73—143 |
| 2,618,970 | 11/1952 | Hitchcock et al. | |
| 3,394,587 | 7/1968 | Freeman | 73—143 |

FOREIGN PATENTS

| 130,231 | 1959 | U.S.S.R. |

CHARLES A. RUEHL, Primary Examiner

U.S. Cl. X.R.

177—147